(12) United States Patent
Miyata et al.

(10) Patent No.: US 7,350,808 B2
(45) Date of Patent: Apr. 1, 2008

(54) ACTIVATION CONTROL UNIT AND CONTROL METHOD THEREOF FOR OCCUPANT PROTECTION APPARATUS

(75) Inventors: Yujiro Miyata, Toyota (JP); Motomi Iyoda, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 471 days.

(21) Appl. No.: 10/486,084

(22) PCT Filed: Aug. 8, 2002

(86) PCT No.: PCT/IB02/03101

§ 371 (c)(1),
(2), (4) Date: Jul. 15, 2004

(87) PCT Pub. No.: WO03/013911

PCT Pub. Date: Feb. 20, 2003

(65) Prior Publication Data

US 2004/0243294 A1 Dec. 2, 2004

(30) Foreign Application Priority Data

Aug. 9, 2001 (JP) .............................. 2001-242553

(51) Int. Cl.
*B60R 21/0136* (2006.01)
(52) U.S. Cl. .......................... 280/735; 180/274; 701/45
(58) Field of Classification Search ................ 180/268, 180/274, 282; 280/735, 806; 701/45
See application file for complete search history.

(56) References Cited

U.S. PATENT DOCUMENTS

| | | | |
|---|---|---|---|
| 6,186,539 B1 | 2/2001 | Foo et al. | 280/735 |
| 6,196,578 B1 | 3/2001 | Iyoda | 280/735 |
| 6,324,454 B1 * | 11/2001 | Obata et al. | 701/45 |
| 6,327,527 B1 * | 12/2001 | Imai et al. | 701/45 |
| 6,424,899 B2 * | 7/2002 | Imai et al. | 701/45 |
| 6,647,331 B2 * | 11/2003 | Imai et al. | 701/45 |

FOREIGN PATENT DOCUMENTS

| | | |
|---|---|---|
| EP | 0 987 151 | 3/2000 |
| JP | 10-152 014 | 6/1998 |
| JP | 2000-344046 | 12/2000 |
| JP | 2002-104130 | 4/2002 |

\* cited by examiner

*Primary Examiner*—Paul N. Dickson
*Assistant Examiner*—George D Spisich
(74) *Attorney, Agent, or Firm*—Kenyon & Kenyon LLP

(57) ABSTRACT

A floor sensor (14) is disposed at a center portion of a vehicle body (10) and front sensors (16, 18) are disposed at front portions of the vehicle body (10). An airbag apparatus (30) always activates when a value determined by the relationship between a floor deceleration (GF) detected by the floor sensor (14) and a change in floor velocity (Vn) exceeds a High Map toward the high side of the floor velocity. The airbag apparatus (30) also activates on the condition that the value determined by the relationship between the front deceleration (Gs\*) detected by the front sensors (16, 18) and the change in floor velocity (Vn) exceeds a Front Map toward the high side of the floor deceleration (GF) when the value determined by the relationship between the floor deceleration (GF) detected by the floor sensor (14) and the change in floor velocity (Vn) exceeds the Low Map but does not exceed the High Map toward the high side of the floor velocity.

31 Claims, 6 Drawing Sheets

ACTIVATION CONTROL UNIT AND CONTROL METHOD THEREOF FOR OCCUPANT PROTECTION APPARATUS

This is a 371 of PCT/IB02/03101 filed 8 Aug. 2002, which claims priority to JP 2001-242553 filed 9 Aug. 2001, the contents of which are incorporated herein by reference.

BACKGROUND OF THE INVENTION

1. Field of Invention

The invention relates generally to an activation control unit and a control method thereof for an occupant protection apparatus. More specifically, the invention relates to a preferred activation control unit and a control method thereof for an occupant protection apparatus that activates the occupant protection apparatus in order to protect an occupant when a vehicle is involved in a collision.

2. Description of Related Art

One example of related art is an activation control unit for an occupant protection apparatus such as that disclosed in Japanese Patent Application Laid-Open Publication No. 10-152014. This unit includes a floor sensor provided in a center portion in the vehicle body, for outputting a signal indicative of an impact received by a vehicle body during a collision. When a parameter based on the output signal from that floor sensor exceeds a threshold value, the unit deploys an airbag which serves as an occupant protection apparatus. This unit also includes a front sensor provided on a front portion of the vehicle body, for detecting a signal indicative of the impact received by that portion of the vehicle body. The unit changes the threshold value to a small value when the impact received by the front portion of the vehicle body in a collision, which is indicated by the output signal from the front sensor, becomes equal to, or greater than, a reference value. This construction facilitates deployment of the airbag when a large impact is received by the front portion of the vehicle body during a collision. Therefore, with this unit, it is possible to appropriately activate the airbag apparatus in order to protect an occupant in a collision in which the airbag should be deployed even when there is not a lot of impact on the center portion of the vehicle body.

Depending on the type of collision, even if there is not a lot of impact on the center portion of the vehicle body, there are cases in which it is necessary that the airbag deploy if the impact on the front portion of the vehicle body is large. Conversely, as well, there are also cases in which, even if the front portion of the vehicle body receives a large impact, it is not necessary that the airbag deploy. However, in the aforementioned unit, because the threshold value for activating the airbag apparatus is always changed to a small value when an impact on the front portion of the vehicle body during a collision is equal to, or greater than, a reference value, it is possible that the airbag might deploy accidentally. Therefore, in deploying the airbag apparatus appropriately according to the type of collision, it is not always appropriate to change the threshold value for activating the airbag apparatus when the impact on the front portion of the vehicle body during a collision is equal to, or greater than, the reference value, as with the aforementioned unit.

SUMMARY OF THE INVENTION

In view of the foregoing drawbacks, it is an object of the invention to provide an activation control unit and a control method thereof for an occupant protection apparatus in which it is possible to improve the accuracy of detecting whether to activate the occupant protection apparatus.

In order to achieve the foregoing object, according to one or more aspects of the invention, an activation control unit for an occupant protection apparatus includes i) a first sensor disposed in a predetermined location in a vehicle, the first sensor detecting a signal indicative of a deceleration acting on the vehicle, ii) second sensors disposed farther forward than the location in which the first sensor is disposed in the vehicle, the second sensors detecting signals indicative of a deceleration acting on the vehicle, and iii) activation controlling means for determining whether to activate the occupant protection apparatus mounted in the vehicle, wherein the activation controlling means makes a determination to activate the occupant protection apparatus when the deceleration obtained based on an output signal from the first sensor exceeds a first threshold value, or when the deceleration obtained based on the output signal from the first sensor exceeds a third threshold value that is smaller than the first threshold value and the deceleration obtained from output signals from the second sensors exceeds a second threshold value according to a predetermined pattern.

Further, according to one or more aspects of the invention, an activation control unit for an occupant protection apparatus includes i) a first sensor disposed in a predetermined location in the vehicle, the first sensor detecting a signal indicative of a deceleration acting on the vehicle, ii) second sensors disposed farther forward than the location in which the first sensor is disposed in the vehicle, the second sensors detecting signals indicative of a deceleration acting on the vehicle, and iii) activation controlling means for determining whether to activate the occupant protection apparatus mounted in the vehicle, wherein the activation controlling means makes a determination to activate the occupant protection apparatus based on whether the deceleration obtained based on an output signal from the first sensor exceeds a first threshold value which is set according to whether the deceleration obtained based on output signals from the second sensors exceeds a second threshold value which changes according to a predetermined pattern.

Further, according to one or more aspects of the invention, an activation control unit for an occupant protection apparatus detects a first deceleration acting on a predetermined location in a vehicle, detects a second deceleration acting on a location farther forward than that predetermined location, and makes a determination to activate the occupant protection apparatus when the first deceleration exceeds a first threshold value, or when the first deceleration exceeds a second threshold value that is smaller than the first threshold value and the second deceleration exceeds a third threshold value that changes according to a predetermined pattern.

In addition, according to one or more aspects of the invention, an activation control unit for an occupant protection apparatus detects a first deceleration acting on a predetermined location in a vehicle, detects a second deceleration acting on a location farther forward than that predetermined location, and determines whether to activate the occupant protection apparatus that is mounted in the vehicle based on whether the first deceleration exceeds a first threshold value set according to whether the second deceleration exceeds a second threshold value which changes according to a predetermined pattern.

Accordingly, because the threshold value used to activate the occupant protection apparatus is changed based on the deceleration detected by the first sensor and the deceleration detected by the second sensors, compared with a construction in which the threshold value is kept constant, it is possible to precisely determine whether to activate the occupant protection apparatus, in turn making it possible to improve the accuracy of activation determination.

DETAILED DESCRIPTION

Figure 1:
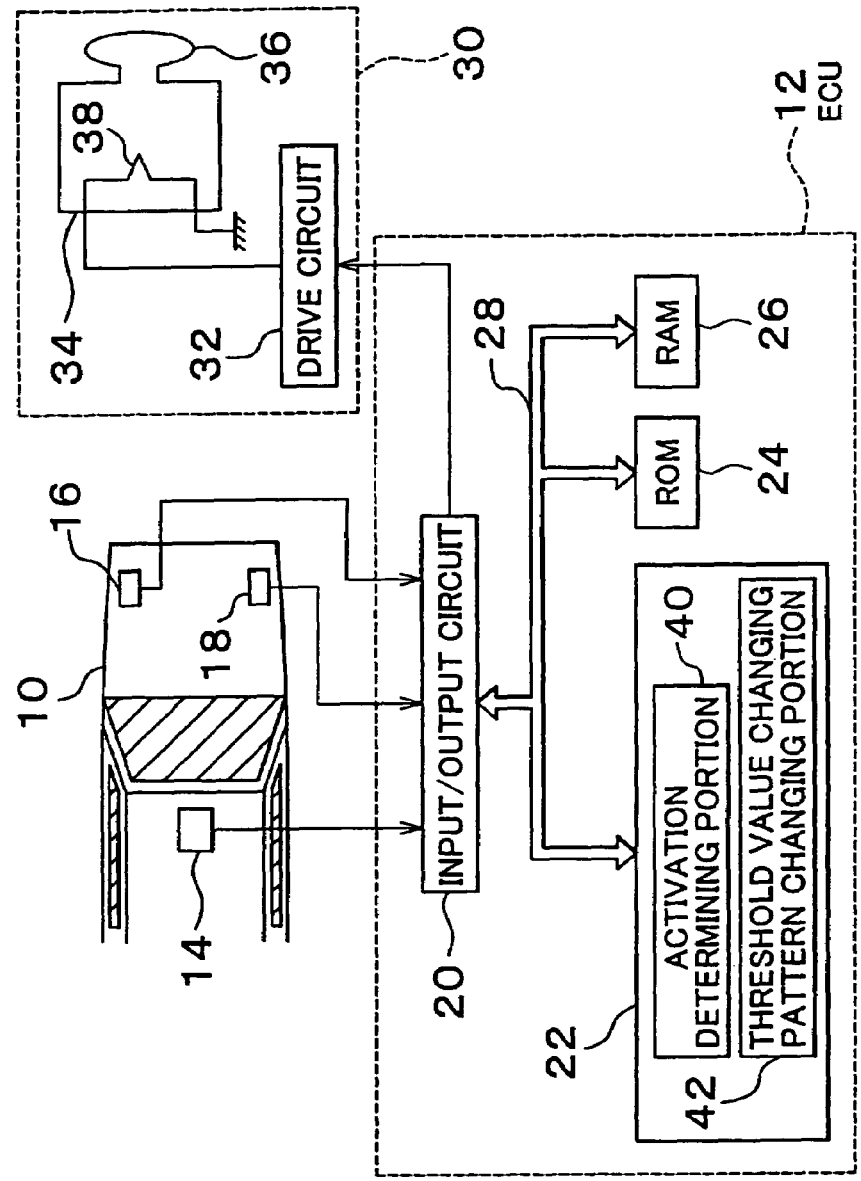
FIG. 1 is a system block diagram of an activation control unit for an occupant protection apparatus according to one embodiment of the invention.

FIG. 1 is a system block diagram of an activation control unit of an occupant protection apparatus according to one exemplary embodiment of the invention. The system according to this exemplary embodiment is provided with, and controlled by, an electronic control unit (hereinafter referred to as "ECU") 12 mounted in a vehicle 10. The system of this exemplary embodiment is also provided with a floor sensor 14 disposed near a floor tunnel in a center portion of the vehicle body, a front sensor 16 mounted to a side member of a left front portion of the vehicle body, and a front sensor 18 mounted to a side member of a right front portion of the vehicle body. The floor sensor 14, front sensor 16, and front sensor 18 serve as electronic deceleration sensors which output signals indicative of an amount of impact, i.e., rate of deceleration, that acts, in the fore-aft direction of the vehicle, on each portion where the sensors are mounted.

The ECU 12 includes an input/output circuit (I/O) 20, a central processing unit (hereinafter referred to as "CPU") 22, read only memory (hereinafter referred to as "ROM") 24, random access memory (hereinafter referred to as "RAM") 26, and a unidirectional bus 28 which connects all of these elements together. A processing program and a table necessary for calculations are stored in the ROM 24. The RAM 26 is used as the work area.

The floor sensor 14, the front sensor 16, and the front sensor 18 are all connected to the input/output circuit 20 of the ECU 12. Output signals from the floor sensor 14, the front sensor 16, and the front sensor 18 are output to the input/output circuit 20 and stored appropriately in the RAM 26 in accordance with a command from the CPU 22. The ECU 12 detects a rate of deceleration (hereinafter referred to as "floor deceleration") GF acting on the center portion of the vehicle body based on the output signal from the floor sensor 14. The ECU 12 also detects a rate of deceleration (hereinafter referred to as "front deceleration") GSL acting on the left front portion of the vehicle body based on the output signal from the front sensor 16, as well as a rate of deceleration (hereinafter also referred to as "front deceleration") GSR acting on the right front portion of the vehicle body based on the output signal from the front sensor 18. The front deceleration GSL and the front deceleration GSR together will be referred to as front deceleration Gs*.

The system according to this exemplary embodiment is provided with an airbag apparatus 30 which is mounted in the vehicle 10 and which serves as an occupant protection apparatus by activating so as to protect the occupant when the vehicle is involved in a collision. The airbag apparatus 30 includes a drive circuit 32, an inflator 34, and an airbag 36. The inflator 34 houses an ignition device 38, which is connected to the drive circuit 32, and a gas generating agent, not shown, which generates a large amount of gas by heat generated by the ignition device 38. The input/output circuit 20 sends a drive signal to the drive circuit 32, which in turn sends a command to the ignition device 38 to generate heat such that gas is produced. The inflator 34 then uses this gas to deploy the airbag 36, which when deployed, is in a location between the occupant and onboard parts of the vehicle 10.

The drive circuit 32 of the airbag apparatus 30 is connected to the input/output circuit 20 of the ECU 12. The CPU 22 of the ECU 12 is provided with an activation control portion 40 and a threshold value changing pattern changing portion 42.

The activation control portion 40 of the CPU 22 first determines whether to activate the airbag apparatus 30 based on the floor deceleration GF detected using the output signal from the floor sensor 14 according to the processing program stored in the ROM 24, and then controls the output of the drive signal from the input/output circuit 20 to the drive circuit 32 of the airbag apparatus 30 accordingly based on that determination. In addition, the threshold value changing pattern changing portion 42 determines which threshold value changing pattern (hereinafter referred to as "activation threshold value changing pattern"), of a plurality thereof in a determination map for determining activation of the airbag apparatus 30 using the activation control portion 40, is adopted based on the floor deceleration GF, the front deceleration GSL, and the front deceleration GSR. These series of operations will be described in detail later.

Next, the specific contents of the processing performed by the CPU 22 in this exemplary embodiment will be described.

Figure 2:
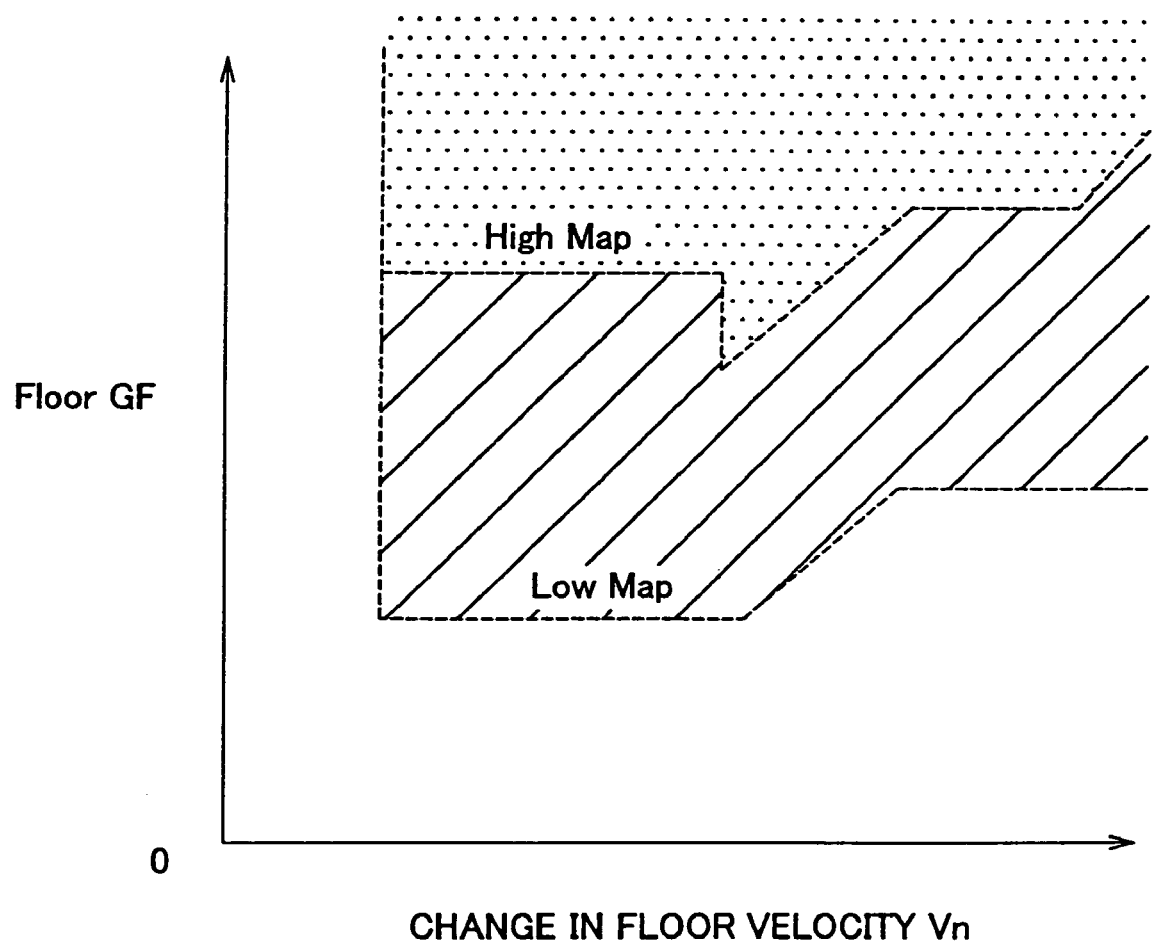
FIG. 2 is a graph showing a determination map for determining whether to activate the occupant protection apparatus according to this exemplary embodiment.

FIG. 2 is a graph showing a determination map for determining whether to activate the airbag apparatus 30 according to this exemplary embodiment. In the figure, two activation threshold value changing patterns, a High Map and a Low Map, are shown with dashed lines. The High Map is set as a boundary above which it is necessary to have the airbag apparatus 30 activate when the vehicle 10 receives an impact, and below which it is not necessary to have the airbag apparatus 30 activate when the vehicle 10 receives an impact. The Low Map is set as a boundary above which it is necessary to have the airbag apparatus 30 activate under predetermined conditions when the vehicle 10 receives an impact, and below which it is not necessary to have the airbag apparatus 30 activate when the vehicle 10 receives an impact. Both the High Map and the Low Map are recorded in the ROM 24 beforehand.

According to this exemplary embodiment, the activation control portion 40 performs time integration at regular intervals of time (e.g., 10 msec) for the floor deceleration GF that was detected based on the output signal from the floor sensor 14, and obtains a change in floor velocity Vn per unit time. When the floor deceleration GF is added to the vehicle 10 while the vehicle 10 is traveling, objects (e.g., occupants) within the vehicle are accelerated forward with respect to the vehicle due to inertial force. Therefore, the relative change in floor velocity Vn of the objects in the vehicle 10 is obtained by time integrating the floor deceleration GF. Then, after obtaining the change in floor velocity Vn, the activation control portion 40 determines whether the value determined by the relationship between the floor deceleration GF and the change in floor velocity Vn is within one of the areas divided by the activation threshold value changing patterns of the High Map and the Low Map in the determination map shown in FIGS. 2 and 3.

When the activation control portion 40 determines that the value determined by the relationship between the floor deceleration GF and the change in floor velocity Vn is within an area (the dotted area in FIG. 2) toward the high side of the floor deceleration GF that is above the High Map, the activation control portion 40 determines that a large impact is being received by the center portion of the vehicle body. In this case, the activation control portion 40 always outputs a drive signal to the drive circuit 32 of the airbag apparatus 30 from the input/output circuit 20 in order to deploy the airbag 36. The airbag apparatus 30 then activates and deploys the airbag 36. In other words, the airbag 36 is always deployed when the value determined by the relationship between the floor deceleration GF and the change in floor velocity Vn is within the dotted area in FIG. 2.

As described above, the High Map is set as a boundary above which it is necessary to have the airbag apparatus 30 activate when the vehicle 10 receives an impact, and below which it is not necessary to have the airbag apparatus 30 activate when the vehicle 10 receives an impact. Depending on the type of collision the vehicle is involved in, though, there may be cases in which it is necessary for the airbag apparatus 30 to activate even when the value determined by the relationship between the floor deceleration GF and the change in floor velocity Vn is within an area (the non-dotted area in FIG. 2) where it is not necessary that the airbag apparatus 30 activate. More specifically, when the vehicle 10 is involved in an oblique collision with an obstacle while traveling at medium speed (e.g., 32 km/h), even though the value determined by the relationship between floor deceleration GF and change in floor velocity Vn is not above the High Map, it is still necessary that the airbag apparatus 30 activate.

On the other hand, when the vehicle 10 is involved in an oblique collision at medium speed, a large impact is received by that front portion of the vehicle body. When a large impact force is exerted on the front portion of the vehicle body, i.e., when a large deceleration is generated at the left front portion or right front portion of the vehicle body, it is necessary that the airbag apparatus 30 activate if the value determined by the relationship between the floor deceleration GF and the change in floor velocity Vn is within an area (the area illustrated with diagonal lines in FIG. 2) above the Low Map, but not above the High Map. According to this construction, the airbag 36 deploys appropriately when the vehicle 10 is involved in an oblique collision at medium speed even if the center portion of the vehicle does not receive a large impact. As a result, the occupant is effectively protected.

Figure 3:
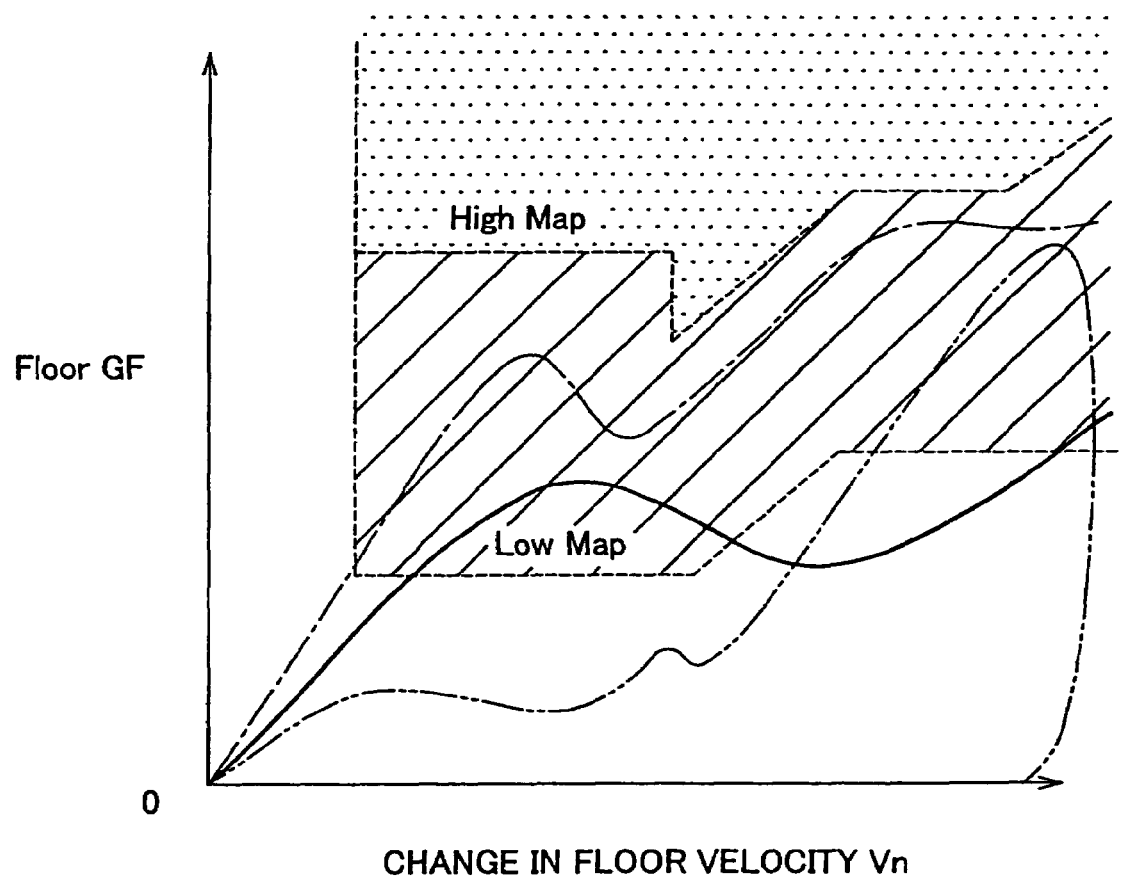
FIG. 3 is a graph showing the relationship between floor deceleration GF and change in floor velocity Vn for different types of collisions.

FIG. 3 is a graph showing the relationship between the floor deceleration GF and the change in floor velocity Vn for different types of collisions. More specifically in the figure, the solid line represents a case in which the vehicle 10 is involved in an oblique collision while traveling at medium speed, the one-dot chain line represents a case in which the vehicle 10 is involved in a frontal collision while traveling at low speed (e.g., 18 km/h), and the two-dot chain line represents a case in which the vehicle 10 collides with an obstacle in such a way as to travel beneath, or ride under, a lower portion of the obstacle, i.e., an underride collision.

On the other hand, however, with some types of collisions it is not necessary that the airbag apparatus 30 activate, even when the front portion of the vehicle receives a large impact. For example, when the vehicle 10 is involved in a frontal collision with an obstacle while traveling at low speed, or when the vehicle 10 is involved in an underride collision while traveling at low speed, it is not necessary that the airbag apparatus 30 activate. However, the value determined by the relationship between the floor deceleration GF and the change in floor velocity Vn in both of these types of collisions is within an area (the area illustrated with diagonal lines in FIGS. 2 and 3) between the Low Map and the High Map on the determination map, as shown in FIG. 3, which means that a deceleration equal to, or greater than, that generated in an oblique collision at medium speed is generated in the front portion of the vehicle body. Therefore, even if the value determined by the relationship between the floor deceleration GF and the change in floor velocity Vn in both of these types of collisions is within the area illustrated by diagonal lines in FIGS. 2 and 3, when the threshold value for activating the airbag apparatus 30 is kept constant, the airbag apparatus 30 may accidentally activate despite the fact that it is not necessary. (Here, the threshold value is a threshold value for the deceleration of the front portion of the vehicle body in order to adopt the Low Map on the determination map shown in FIG. 2 and FIG. 3.) It is therefore not appropriate to keep the threshold value for deceleration of the front portion of the vehicle body constant in order to activate the airbag apparatus 30 appropriately according to the type of collision.

Therefore, the system according to this exemplary embodiment has a characteristic that activation determination of the airbag apparatus 30 is done accurately and appropriately according to the type of collision by changing the threshold value for the deceleration acting on the front portion of the vehicle body according to a predetermined pattern. Hereinafter, this characteristic of this exemplary embodiment will be described with reference to FIGS. 4 and 5.

Figure 4:
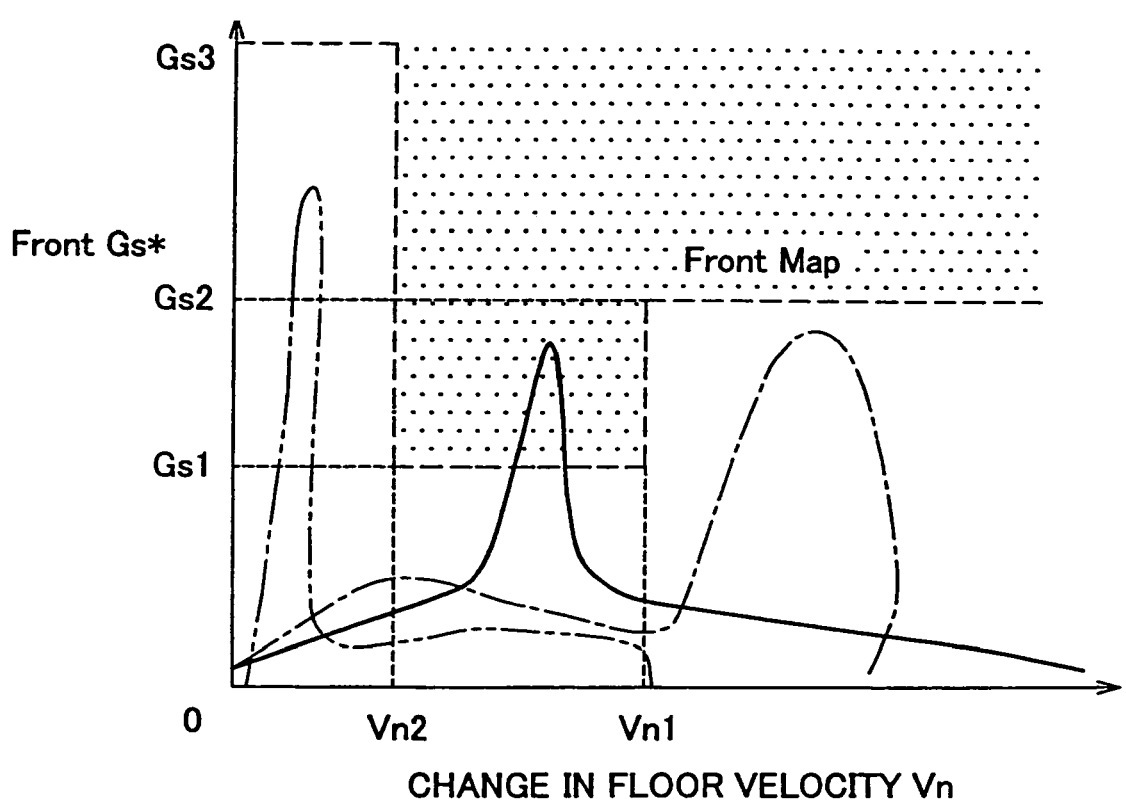
FIG. 4 is a graph showing a threshold value changing pattern for deceleration in a front portion of a vehicle body in order to determine whether to adopt a Low Map as an activation threshold value changing pattern in the determination map shown in FIG. 2 according to this exemplary embodiment.

FIG. 4 is a graph showing a front threshold value changing pattern for the deceleration of the front portion of the vehicle body. This front threshold changing pattern is used for determining whether to adopt the Low Map as the activation threshold value changing pattern in the determination map shown in FIGS. 2 and 3 according to this exemplary embodiment. The dashed line in the FIG. 4 represents the Front Map as the front threshold value changing pattern. This Front Map is set as a boundary above which the Low Map as the activation threshold value changing pattern is adopted and below which the Low Map as the activation threshold value changing pattern is not adopted. Also in FIG. 4, the solid line represents a case in which the vehicle 10 is involved in an oblique collision while traveling at medium speed, the one-dot chain line represents a case in which the vehicle 10 is involved in a frontal collision while traveling at low speed, and the two-dot chain line represents a case in which the vehicle 10 is involved in an underride collision while traveling at low speed.

In a situation where the value determined by the relationship between the floor deceleration GF and the change in floor velocity Vn is in the area between the Low Map and the High Map in the determination map shown in FIG. 3, the period where the front deceleration Gs*, acting on the front portion of the vehicle body, reaches its peak differs depending on whether the vehicle 10 is involved in an oblique collision at medium speed, a frontal collision at low speed, or an underride collision at low speed. Here, it is necessary that the airbag apparatus 30 activate when the vehicle 10 is involved in an oblique collision at medium speed, but it is not necessary that the airbag apparatus 30 activate when the vehicle 10 is involved in either a frontal collision at low speed or an underride collision at low speed. More specifically, the relationship between each of the front deceleration Gs* and the change in floor velocity Vn per unit time for the floor deceleration GF acting on the center portion of the vehicle body is shown in FIG. 4.

Accordingly, the Front Map as the front threshold value changing pattern is set by the relationship between the front deceleration Gs* and the change in floor velocity Vn so that when the vehicle 10 is involved in an oblique collision at medium speed, the Low Map will be adopted, and when the vehicle 10 is involved in either a frontal collision or an underside collision at low speed, the Low Map will not be adopted. This makes it possible to have the airbag apparatus 30 activate appropriately according to the type of collision. That is, the threshold value relating to the front deceleration Gs* in order to the Low Map as the activation threshold value changing pattern is changed in accordance with the change in floor velocity Vn which can be obtained by time integrating the floor deceleration GF of the center portion of the vehicle.

According to this exemplary embodiment, the Front Map is recorded in the ROM 24 beforehand as the front threshold value changing pattern according to the relationship between the front deceleration Gs* and the change in floor velocity Vn, in which the Low Map is adopted in the case of an oblique collision at medium speed, but is not adopted in the case of a frontal collision at low speed or an underride collision at low speed. More specifically, when the change in floor velocity Vn is equal to, or less than, a second value Vn2, the threshold value relating to the front deceleration Gs* on the Front Map is set to a large value Gs3 so that the Low Map will not be adopted in an underride collision at low speed. When the change in floor velocity Vn exceeds the second value Vn2 and is equal to, or less than a first value Vn1 that is larger than the second value Vn2, the threshold value relating to the front deceleration Gs* on the Front Map is set to a small value Gs1 so that the Low Map will be adopted in an oblique collision at medium speed. Also, when the change in floor velocity Vn exceeds the first value Vn1, the threshold value relating to the front deceleration Gs* on the Front Map is set to Gs2, which is between Gs3 and Gs1, so that the Low map will not be adopted in a frontal collision at low speed.

Just like the activation control portion 40, the threshold value changing pattern changing portion 42 performs time integration at regular intervals of time for the floor deceleration GF that was detected based on the output signal from the floor sensor 14, and obtains the change in floor velocity Vn per unit time. The threshold value changing pattern changing portion 42 then determines which one of the values, from among the value determined by the relationship between the change in floor velocity Vn and the front deceleration GSL for the floor deceleration GF and the value determined by the relationship between the change in floor velocity Vn and the front deceleration GSR, belongs to which area, of the areas divided by the front threshold value changing pattern of the Front Map on the determination map in FIG. 4. The front deceleration GSL is detected based on the output signal from the front sensor 16 and the front deceleration GSR is detected based on the output signal from the front sensor 18.

When the threshold value changing pattern changing portion 42 has determined that the value determined by the relationship between the front deceleration Gs* and the change in floor velocity Vn is within an area (the dotted area in FIG. 4) on the high side of the front deceleration Gs* above the Front Map, the threshold value changing pattern changing portion 42 outputs a predetermined signal to the activation control portion 40. This signal adopts the Low Map as the activation threshold value changing pattern, and will hereinafter be referred to as the "Low Map adoption signal". Further, when the threshold value changing pattern changing portion 42 has determined that the value determined by the relationship between the front deceleration Gs* and the change in floor velocity Vn is not within the dotted area in FIG. 4, the threshold value changing pattern changing portion 42 does not output the Low Map adoption signal to the activation control portion 40.

Figure 5:
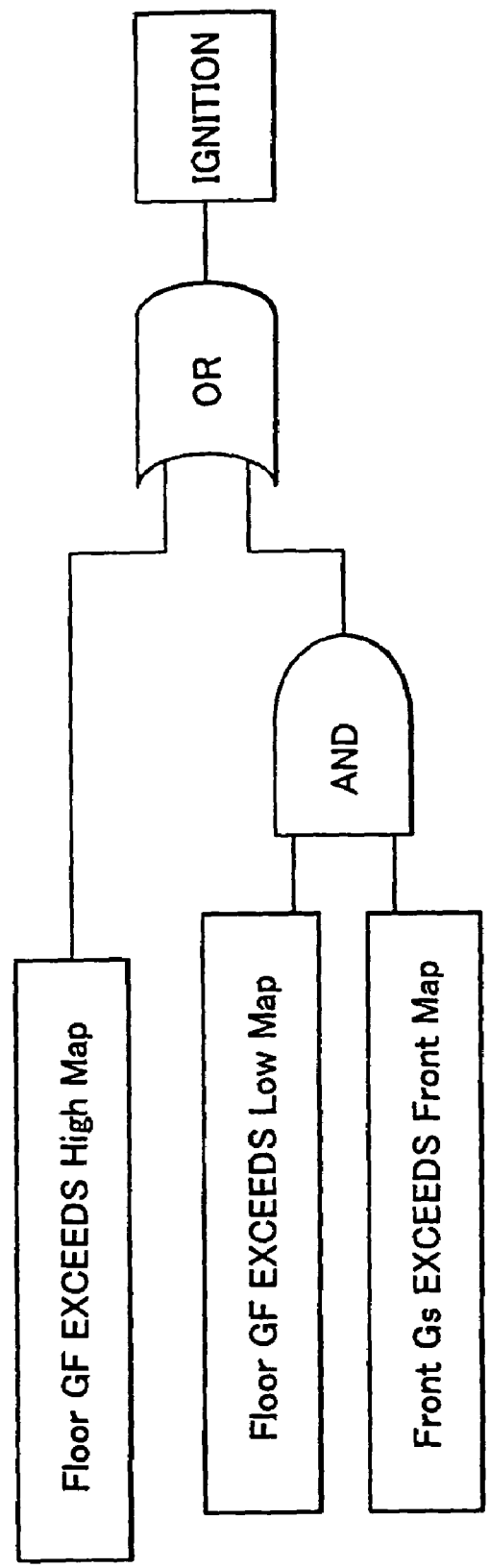
FIG. 5 is a block view of the conditions for activating an airbag apparatus according to this exemplary embodiment.

FIG. 5 is a block diagram showing the conditions for activating the airbag apparatus 30 according to this exemplary embodiment. In this exemplary embodiment, when the activation control portion 40 receives the Low Map adoption signal output from the threshold value changing pattern changing portion 42 and has determined that the value determined by the relationship between the floor deceleration GF and the change in floor velocity Vn is within an area (the area illustrated by the diagonal lines in FIG. 2) on the high side of the floor deceleration GF above the Low Map but not above the High Map, the activation control portion 40 outputs a drive signal from the input/output circuit 20 to the drive circuit 32 of the airbag apparatus 30 in order to deploy the airbag 36, just as when the activation control portion 40 has determined that that value exceeds the threshold value on the High Map. In this case as well, the airbag 36 is deployed by activation of the airbag apparatus 30. Accordingly, the airbag 36 will be deployed under the condition that the value determined by the relationship between the front deceleration Gs* and the change in floor velocity Vn is within the dotted area in FIG. 4. when the value determined by the relationship between the floor deceleration GF and the change in floor velocity Vn is not within the dotted area, but is within the area denoted by diagonal lines in FIG. 2.

In this way, according to the system in this exemplary embodiment, the airbag apparatus 30 is activated when the floor deceleration GF exceeds the threshold value on the High Map that changes in accordance with the change in floor velocity Vn, or when the floor deceleration GF exceeds the threshold value on the Low Map that changes in accordance with the change in floor velocity Vn and the front deceleration Gs* exceeds the threshold value on the Front Map that changes in accordance with the change in floor velocity Vn, as shown in FIG. 5. That is, according to this exemplary embodiment, the airbag apparatus 30 will activate only under the condition that the front deceleration Gs* exceeds the threshold value on the Front Map that changes in accordance with the change in floor velocity Vn when the floor deceleration GF exceeds the threshold value on the Low Map but does not exceed the threshold value on the High Map in accordance with the change in floor velocity Vn.

According to this construction, the threshold value for the front deceleration Gs* on the Front Map changes according to the change in floor velocity Vn. As a result, compared with the construction in which that threshold value is kept constant so as not to change according to the change in floor velocity Vn, activation determination for the airbag apparatus 30 is able to be done precisely by combining the floor deceleration GF obtained from the floor sensor 14 and the front deceleration Gs* obtained from the front sensor 16 and the front sensor 18.

More specifically, in a case where the vehicle 10 is involved in an oblique collision at medium speed in which it is necessary that the airbag apparatus 30 activate, a case where the vehicle 10 is involved in a frontal collision at low speed in which it is not necessary that the airbag apparatus 30 activate, and a case where the vehicle 10 is involved in an underride collision at low speed in which it is not necessary that the airbag apparatus 30 activate, the relationships determined by the floor deceleration GF and the change in floor velocity Vn are all similar and the amounts of the front deceleration Gs* are all similar. However, since the periods where the front deceleration Gs* reach their peaks are all different, the wave forms showing the relationships between the front deceleration Gs* and the change in floor velocity Vn do not resemble each other, as shown in FIG. 4. As described above, according to this exemplary embodiment, because the threshold value for the front deceleration Gs* on the Front Map changes according to the change in floor velocity Vn, it is possible to activate the airbag apparatus 30 in an oblique collision at medium speed and inhibit the airbag apparatus 30 from activating in both a frontal collision at low speed and an underride collision at low speed.

Therefore, according to this exemplary embodiment, the airbag apparatus 30 is able to be activated appropriately according to the type of collision, which includes an oblique collision at medium speed, a frontal collision at low speed, and an underride collision at low speed. Therefore, according to the system of this exemplary embodiment, it is possible to improve the determination accuracy of whether to activate the airbag apparatus 30, which in turn makes it possible to protect the occupant appropriately according to the type of collision.

As described above, according to the system of this exemplary embodiment, the airbag apparatus 30 is activated when the floor deceleration GF exceeds the threshold value on the High Map that changes in accordance with the change in floor velocity Vn, or when the floor deceleration GF exceeds the threshold value on the Low Map that changes in accordance with the change in floor velocity Vn and the front deceleration Gs* exceeds the threshold value on the Front Map that changes in accordance with the change in floor velocity Vn.

This is equivalent to a construction in which the activation threshold value for activating the airbag apparatus 30 is changed to from a threshold value on the High Map to a threshold value on the Low Map when the front deceleration Gs* exceeds a threshold value on the Front Map according to the change in floor velocity Vn. More specifically, it is first determined whether the front deceleration Gs*, which is based on the output signals from the front sensor 16 and the front sensor 18, has exceeded the threshold value Gs1 on the Front Map in FIG. 4. Then, if the front deceleration Gs* has exceeded the threshold value Gs1, the activation threshold value is changed from the High Map to the Low Map on the determination map in FIG. 3.

Also at the same time, it is also equivalent to a construction in which the activation threshold value on the determination map in FIG. 3 is set as the threshold value on the High Map when the front deceleration Gs* does not exceed the threshold value on the Front Map according to the change in floor velocity Vn, and the activation threshold value on the determination map in FIG. 3 is set as the threshold value on the Low Map when the front deceleration Gs* exceeds the threshold value on the Low Map. More specifically, it is first determined whether the front deceleration Gs*, which is based on the output signals from the front sensor 16 and the front sensor 18, has exceeded the threshold value Gs1 on the Front Map in FIG. 4. Then, if the front deceleration Gs* has not exceeded the threshold value Gs1, the activation threshold value is set as the High Map on the determination map in FIG. 3. Also, if the front deceleration Gs* has exceeded the threshold value Gs1, the activation threshold value is set as the Low Map on the determination map in FIG. 3.

That is, according to this construction, when the front deceleration Gs* does not exceed the threshold value on the Front Map according to the change in floor velocity Vn, the threshold value on the High Map is used as the activation threshold value for the airbag apparatus 30. On the other hand, when the front deceleration Gs* exceeds the threshold value on the Front Map according to the change in floor velocity Vn, the threshold value on the Low Map is used as the activation threshold value for the airbag apparatus 30.

In the foregoing exemplary embodiment, the airbag apparatus 30 corresponds to the "occupant protection apparatus". In the same manner, the floor sensor 14 corresponds to the "first sensor" and the front sensor 16 and front sensor 18 correspond to the "second sensors". Further, the threshold value on the High Map as the activation threshold value changing pattern corresponds to the "first threshold value" in claim 1, 4 to 7, 13 and 16 to 19, the threshold value on the Low Map as the activation threshold value changing pattern corresponds to the "second threshold value" in claim 1 and the "first threshold value" in claim 4 to 7 and 16 to 19, and the threshold value on the Front Map as the front threshold value changing pattern corresponds to the "third threshold value" in claim 1 to 3 and 13 to 15 and the "second threshold value" in claim 4 to 9 and 16 to 21.

Also according to the exemplary embodiment described above, the first value Vn1 corresponds to the "first value", the second value Vn2 corresponds to the "second value", the threshold value Gs2 for the front deceleration Gs* corresponds to the "predetermined value", the threshold value Gs3 corresponds to the "value that is larger than the predetermined value", and the threshold value Gs1 corresponds to the "value that is smaller than the predetermined value".

Moreover according to the foregoing exemplary embodiment, the "actuation control means" is realized by the activation control portion 40 of the ECU 12 outputting a drive signal from the input/output circuit 20 to the drive circuit 32 of the airbag apparatus 30 when the floor deceleration GF exceeds the threshold value on the High Map as the activation threshold value changing pattern, or when the floor deceleration GF exceeds the threshold value on the Low Map as the activation threshold value changing pattern but does not exceed the threshold value on the High Map, and the front deceleration Gs* exceeds the threshold value on the Front Map as the front threshold value changing pattern. Further, the "activation determining means" is realized by determining whether to output the drive signal from the input/output circuit 20 to the drive circuit 32 of the airbag apparatus 30 based on the determination results of whether the floor deceleration GF exceeds the threshold value on either the High Map or the Low Map as the activation threshold value changing pattern.

Also, the "threshold value changing means" and the "threshold value setting means" are realized by the threshold value changing pattern changing portion 42 adopting the Low Map as the activation threshold value changing pattern in accordance with the relationship between the front deceleration Gs* and the change in floor velocity Vn.

According to the foregoing exemplary embodiment, whether or not to adopt the Low Map as the activation threshold value changing pattern is determined based on the relationship between the front deceleration Gs* and the change in floor velocity Vn per unit time for the floor deceleration GF. However, the invention is not limited to this. For example, it also may be determined based on the relationship between, for example, the floor deceleration GF itself as detected by the floor sensor 14 and the front deceleration Gs*, or a value that has been integrated twice for the floor deceleration GF and the front deceleration Gs*.

Further, according to the foregoing exemplary embodiment, two front sensors, the front sensor 16 and the front sensor 18, which output signals indicative of an impact received by the front portion of the vehicle body are provided in the front portion of the vehicle body. However, according to another exemplary embodiment, only a single front sensor may be provided at the front portion of the vehicle body, and whether the Low Map is adopted may be determined based on the front deceleration indicated by that output signal.

Figure 6:
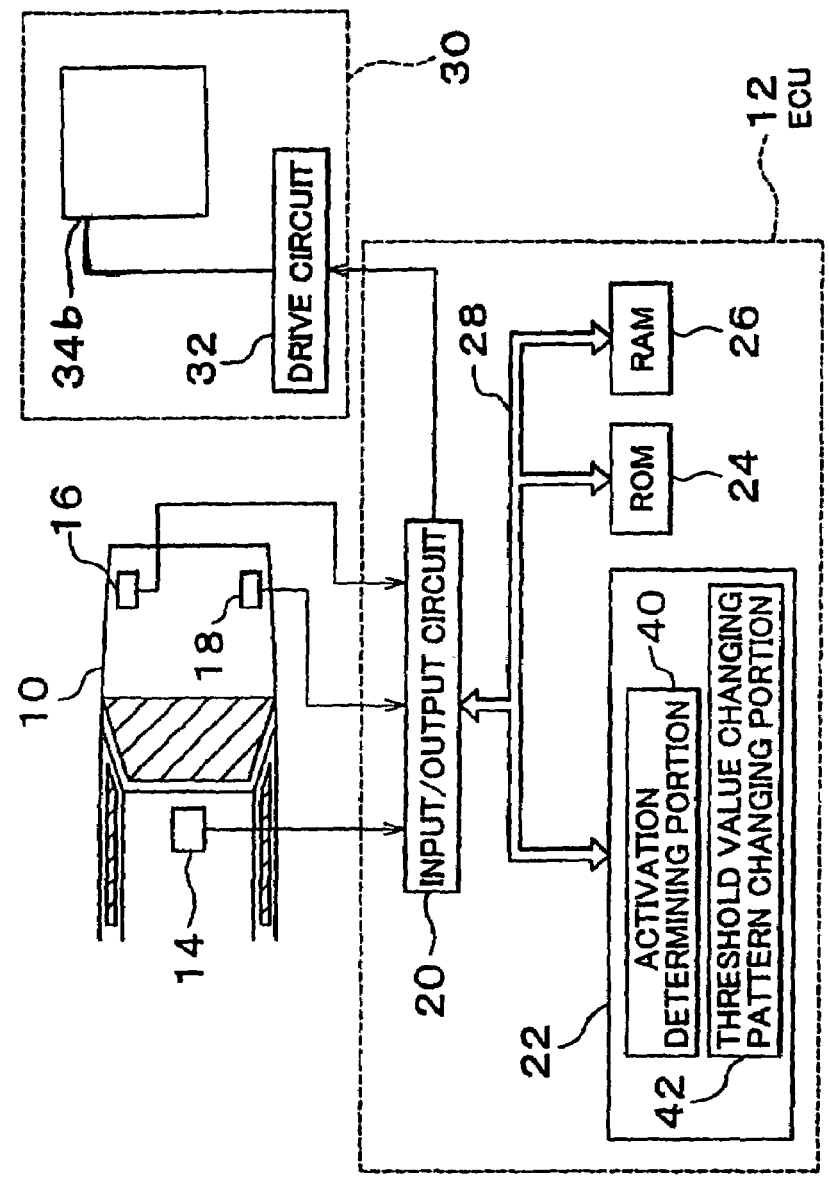
FIG. 6 is a system block diagram of an activation control unit for an occupant protection apparatus according to an alternative embodiment of the present invention.

Further, according to the foregoing exemplary embodiment, an airbag apparatus is used as the occupant protection apparatus. According to another exemplary embodiment, however, as seen in FIG. 6, a seat belt pretensioner 34b may be used. FIG. 6 is identical to FIG. 1 except for seat belt pretensioner 34b is shown in place of the airbag apparatus and associated components.

As described above, according to one aspect of the invention, it is possible to improve the accuracy for determining whether to activate the occupant protection apparatus.

What is claimed is:

1. An activation control unit for an occupant protection apparatus comprising:
   a first sensor disposed in a predetermined location in a vehicle, the first sensor outputting a signal indicative of a deceleration acting on the vehicle;
   second sensors disposed farther forward than the location in which the first sensor is disposed in the vehicle, the second sensors outputting signals indicative of a deceleration acting on the vehicle; and
   an activation controller which determines whether to activate the occupant protection apparatus mounted in the vehicle,
   wherein the activation controller makes a determination to activate the occupant protection apparatus both
   i) when a deceleration obtained based on an output signal from the first sensor exceeds a first threshold value, and
   ii) when the deceleration obtained based on the output signal from the first sensor exceeds a second threshold value that is smaller than the first threshold value and a deceleration obtained based on output signals from the second sensors exceeds a third threshold value,
   wherein a front map is provided for the second sensors comprising the third threshold value which is plotted in a non-linear line, the third threshold value changes according to a variable so as to form a predetermined pattern.

2. The activation control unit according to claim 1, wherein
   the third threshold value changes in accordance with an integrated value of the deceleration obtained based on the output signal from the first sensor.

3. The activation control unit according to claim 2, wherein:
   the third threshold value is set to a predetermined value when the integrated value exceeds a first value;
   the third threshold value is set to a value that is larger than the predetermined value when the integrated value is equal to, or less than, a second value that is smaller than the first value; and
   the third threshold value is set to a value that is smaller than the predetermined value when the integrated value exceeds the second value and is equal to, or less than, the first value.

4. The activation control unit according to claim 1, wherein:
   one of the second sensors is disposed on the left side of the vehicle and the other of the second sensors is disposed on the right side of the vehicle.

5. The activation control unit according to claim 1, wherein:
   the occupant protection apparatus is an airbag.

6. The activation control unit according to claim 1, wherein:
   the occupant protection apparatus is a seatbelt pretensioner.

7. An activation control unit for an occupant protection apparatus, comprising:
   a first sensor disposed in a predetermined location in a vehicle, the first detecting a signal indicative of a deceleration acting on the vehicle;
   second sensors disposed farther forward than the location in which the first sensor is disposed in the vehicle, the second sensors detecting signals indicative of a deceleration acting on the vehicle;
   an activation determining portion which determines whether to activate the occupant protection apparatus based on whether the deceleration obtained based on the output signal from the first sensor exceeds a first threshold value, and;
   a threshold value changing portion which changes the first threshold value in accordance with whether the deceleration obtained based on the output signals from the second sensors exceeds a second threshold value that changes in a predetermined pattern,
   wherein a front map is provided for the second sensors comprising the second threshold value which is plotted in a non-linear line, the second threshold value changes according to a variable so as to form the predetermined pattern.

8. The activation control unit according to claim 7, wherein:
   the threshold value changing portion makes the first threshold value smaller when the deceleration obtained based on the output signals from the second sensors exceeds the second threshold value, than when the deceleration does not exceed the second threshold value.

9. The activation control unit according to claim 7, wherein:
   the second threshold value changes in accordance with an integrated value of the deceleration obtained based on the output signal from the first sensor.

10. The activation control unit according to claim 9, wherein:
the second threshold value is set to a predetermined value when the integrated value exceeds a first value;
the second threshold value is set to a value that is larger than the predetermined value when the integrated value is equal to, or less than, a second value that is smaller than the first value; and
the second threshold value is set to a value that is smaller than the predetermined value when the integrated value both, exceeds the second value and is equal to, or less than, the first value.

11. The activation control unit according to claim 7, wherein:
one of the second sensors is disposed on the left side of the vehicle and the other of the second sensors is disposed on the right side of the vehicle.

12. The activation control unit according to claim 7, wherein:
the occupant protection apparatus is an airbag.

13. The activation control unit according to claim 7, wherein:
the occupant protection apparatus is a seatbelt pretensioner.

14. An activation control unit for an occupant protection apparatus, comprising:
a first sensor disposed in a predetermined location in a vehicle, the first sensor detecting a signal indicative of a first deceleration acting on the vehicle;
second sensors disposed farther forward than the location in which the first sensor is disposed in the vehicle, the second sensors detecting signals indicative of a second deceleration acting on the vehicle, a front map is provided for the second sensors comprising a second threshold value which is plotted in a non-linear line, the second threshold value changes according to a variable so as to form a predetermined pattern;
a threshold value setting portion which sets one value, from among at least a low and a high value, as a first threshold value based on whether the output signals from the second sensors exceed or do not exceed the second threshold value; and
an activation determining portion which determines whether to activate the occupant protection apparatus based on whether the first deceleration obtained based on the output signal from the first sensor exceeds the first threshold value set by the threshold value setting portion.

15. The activation control unit according to claim 14, wherein:
the threshold value setting portion sets the first threshold value smaller when the deceleration obtained based on the output signals of the second sensors exceeds the second threshold value, than when that deceleration does not exceed the second threshold value.

16. The activation control unit according to claim 14, wherein:
the second threshold value changes in accordance with an integrated value of the deceleration obtained based on the output signal from the first sensor.

17. The activation control unit according to claim 16, wherein:
the second threshold value is set to a predetermined value when the integrated value exceeds a first value;
the second threshold value is set to a value that is larger than the predetermined value when the integrated value is equal to, or less than, a second value that is smaller than the first value; and
the second threshold value is set to a value that is smaller than the predetermined value when the integrated value both, exceeds the second value and is equal to, or less than, the first value.

18. The activation control unit according to claim 14, wherein:
one of the second sensors is disposed on the left side of the vehicle and the other of the second sensors is disposed on the right side of the vehicle.

19. The activation control unit according to claim 14, wherein:
the occupant protection apparatus is an airbag.

20. The activation control unit according to claim 14, wherein:
the occupant protection apparatus is a seatbelt pretensioner.

21. A control method of an activation control unit for an occupant protection apparatus, comprising the steps of:
detecting a first deceleration acting on a predetermined location in a vehicle;
detecting a second deceleration acting on a location farther forward than the predetermined location in the vehicle; and
making a determination to activate the occupant protection apparatus both
i) when the first deceleration exceeds a first threshold value, and
ii) when the first deceleration exceeds a second threshold value that is smaller than a first threshold value, and the second deceleration exceeds a third threshold value,
wherein a front map is provided for the second sensors comprising the third threshold value which is plotted in a non-linear line, the third threshold value changes according to a variable so as to form a predetermined pattern.

22. The control method of an activation control unit according to claim 21, further comprising the step of:
changing the third threshold value in accordance with an integrated value of the first deceleration.

23. The control method of an activation control unit according to claim 22, further comprising the steps of:
setting the third threshold value to a predetermined value when the integrated value exceeds a first value;
setting the third threshold value to a value that is larger than the predetermined value when the integrated value is equal to, or less than, a second value that is smaller than the first value, and
setting the third threshold value to a value that is smaller than the predetermined threshold value when the integrated value exceeds the second value and is equal to, or less than, the first value.

24. A control method of an activation control unit for an occupant protection apparatus, comprising the steps of:
detecting a first deceleration acting on a predetermined location in a vehicle;
detecting a second deceleration acting on a location farther forward than the predetermined location in the vehicle; and
determining whether to activate the occupant protection apparatus based on whether the first deceleration exceeds a first threshold value which is set according to whether the second deceleration exceeds a second threshold that changes in a predetermined pattern;

changing the first threshold value in accordance with whether the second deceleration exceeds the second threshold value, and wherein a front map is provided for the second sensors comprising the second threshold value which is plotted in a non-linear line, the second threshold value changes according to a variable so as to form a predetermined pattern.

25. The control method of an activation control unit according to claim 24, further comprising the step of:

making the first threshold value smaller when the second deceleration exceeds the second threshold value, than when that deceleration does not exceed the second threshold value.

26. The control method of an activation control unit according to claim 24, further comprising the step of:

changing the second threshold value in accordance with an integrated value of the first deceleration.

27. The control method of an activation control unit according to claim 26, further comprising the steps of:

setting the second threshold value to a predetermined value when the integrated value exceeds a first value;

setting the second threshold value to a value that is larger than the predetermined value when the integrated value is equal to, or less than, a second value that is smaller than the first value; and setting the second threshold value to a value that is smaller than the predetermined value when the integrated value exceeds a second value and is equal to, or less than, the first value.

28. A control method of an activation control unit for an occupant protection apparatus, comprising the steps of:

detecting a first deceleration acting on a predetermined location in a vehicle with a first sensor;

detecting a second deceleration acting on a location farther forward than the predetermined location in the vehicle with second sensors, a front map is provided for the second sensors comprising a second threshold value which is plotted in a non-linear line, the second threshold value changes according to a variable so as to form a predetermined pattern;

setting one value, from among at least a high and a low value, as a first threshold value, based on whether the second deceleration exceeds or does not exceed the second threshold value; and determining whether to activate the occupant protective apparatus mounted in the vehicle based on whether the first deceleration exceeds the set first threshold value.

29. The control method of an activation control unit according to claim 28, further comprising the step of:

setting the first threshold value smaller when the second deceleration exceeds the second threshold value, than when that deceleration does not exceed the second threshold value.

30. The control method of an activation control unit according to claim 28, further comprising the step of:

changing the second threshold value in accordance with an integrated value of the first deceleration.

31. The control method of an activation control unit according to claim 30, further comprising the steps of, setting the second threshold value to a predetermined value when the integrated value exceeds a first value;

setting the second threshold value to a value that is larger than the predetermined value when the integrated value is equal to, or less than, a second value that is smaller than the first value, and setting the second threshold value to a value that is smaller than the predetermined value when the integrated value exceeds a second value and is equal to, or less than, the first value.

* * * * *